United States Patent [19]

Pierson

[11] Patent Number: 5,366,626
[45] Date of Patent: Nov. 22, 1994

[54] FILTER APPARATUS

[75] Inventor: Henri G. W. Pierson, Tenerife, Spain

[73] Assignee: D & C Limited, Monrovia, Liberia

[21] Appl. No.: 46,191

[22] Filed: Apr. 12, 1993

[30] Foreign Application Priority Data

Apr. 28, 1992 [GB] United Kingdom ............ 9209125.5

[51] Int. Cl.$^5$ .................... B01D 33/04; B01D 33/052
[52] U.S. Cl. ..................... 210/216; 210/350;
210/398; 210/400; 210/401; 210/406; 100/116;
100/118
[58] Field of Search ............... 210/398, 400, 401, 216,
210/406, 350; 100/110, 111, 116, 118, 106, 90

[56] References Cited

U.S. PATENT DOCUMENTS

| | | | |
|---|---|---|---|
| 4,127,487 | 11/1978 | Havalda | 210/350 |
| 4,153,550 | 5/1979 | Lautrette | 210/350 |
| 4,348,290 | 9/1982 | Schipper | 210/350 |
| 4,377,479 | 3/1983 | Pierson | 210/350 |
| 4,377,480 | 3/1983 | Pierson | 210/350 |
| 4,643,826 | 2/1987 | Prunier | 210/350 |
| 4,676,902 | 6/1987 | Fayoux et al. | 210/350 |
| 5,176,073 | 1/1993 | Dressel | 210/401 |

FOREIGN PATENT DOCUMENTS

| | | |
|---|---|---|
| 2030465A | 4/1980 | United Kingdom . |
| 2090764A | 7/1982 | United Kingdom . |
| 2092905A | 8/1982 | United Kingdom . |

*Primary Examiner*—Peter A. Hruskoci
*Assistant Examiner*—Robert James Popovics
*Attorney, Agent, or Firm*—Dennison, Meserole, Pollack & Scheiner

[57] ABSTRACT

In horizontal belt filter apparatus wherein the belt is progressed by alternate incremental motion of the upper run and the lower run, wash liquor used for washing the belt in the lower run, e.g. by spraying into a wash box, is recycled and used for washing filter cake on the upper run at several spaced apart locations. Also, in the upper run, a respective compression device is arranged subsequent to each supply of wash liquor in the direction of travel of the upper run, and during compression gas is blown into the filter cake through the pressure plate of each device so as to maximise extraction of liquid. Trays mounted below the belt are connected to vacuum during stationary periods of the upper run and are arranged to ensure separate collection of liquid for successive sections of the upper run, which liquid may optionally be recycled to upstream locations.

10 Claims, 4 Drawing Sheets

# FILTER APPARATUS

TECHNICAL FIELD

This invention concerns filter apparatus of the type comprising an endless filter belt (sometimes referred to as a cloth), guide means guiding said belt to provide a substantially horizontal upper run and a lower return run, feed means for feeding slurry to be filtered onto said upper run, vacuum means arranged below the upper run of the belt and operative through the belt to suck liquid from slurry on the upper run and leave a filter cake deposited thereon, progressing means operative to progress the belt by alternate incremental motion of the upper run and the lower run, the upper run moving from an upstream end to a downstream end thereof, said progressing means comprising a reciprocal guide element at the downstream end of the upper run and a one way device and tensioning means, both operative on the lower run of the belt.

BACKGROUND ART

Apparatus of this type is disclosed in prior GB specification No. 2030465 of the same inventor.

A further refinement disclosed in prior GB specification No. 2092905, corresponding to U.S. Pat. No. 4,377,480, also of the same inventor, is inclusion of compression means for additionally squeezing liquid from the filter cake formed on the upper run of the belt. The compression means takes the form of a drainage grid located below the upper run of the belt and pressed upwards by an inflatable bag so as to urge the belt and the filter cake thereon into contact with a pressure plate arranged above the belt. Prior GB specification No. 2090764, also of the same inventor, discloses supply of wash liquor, including wash liquor recycled from the vacuum means, to filter cake formed on the upper run of the belt as well as washing of the lower run of the filter belt by directing a jet of wash liquor onto a surface of the belt in the lower run.

Such apparatus has numerous applications in the separation of solids from liquids. It may be used, for example, for extraction of soluble solids from a mixture of solids and liquids. An example of this is the extraction of sugar from sugar beet or sugar cane, or the extraction of coffee, lignin, or dyes. Traditionally, the solids containing the soluble solids are broken up in the presence of a solvent and agitated or otherwise reacted for a given length of time before the insoluble solids are separated from the liquid phase, for example using filter apparatus of the type specified above.

It is normal to "wash" the insoluble solids with further supply of the same solvent or with another wash liquor in order to improve the extraction of soluble solids and/or the purity of the remaining insoluble solids, depending upon which is the commercially valuable product.

In the present economic climate, with greater awareness of need for economy and efficiency as well as minimising adverse effects on the environment, there is increasing demand for improved yield and higher purity of the commercially valuable product, whether soluble or insoluble solid. In apparatus of the type already described, the main requirement is to maximise extraction of soluble solids while using a minimum amount of solvent or wash liquor. Further, washing of the belt in its inoperative run must be as effective as possible, in order not to impair filtration efficiency and movement of the belt, but again the amount of solvent or wash liquor used for this should be minimised.

The conventional method of washing is to use a high pressure jet of wash liquor, as already mentioned. However, since the cleaning action of a liquid is proportional to its pressure the volume used has hitherto been determined by the level of pressure required rather than any other factor. Thus, large quantities of wash liquor have been used for washing filter cake and for subsequent belt washing. Subsequent extraction of relatively small quantities of either soluble or insoluble solids from such liquors has, in itself, been a problem.

OBJECT OF THE INVENTION

An object of the present invention is to improve the known apparatus in such a manner that the efficiency of extraction of soluble or insoluble solids from liquids can be improved and the volume of wash liquor used to extract a given quantity solid can be considerably reduced compared to the volume required hitherto.

SUMMARY OF THE INVENTION

According to the invention apparatus of the above-mentioned type is thus improved by having a plurality of means for supplying wash liquor to successive sections of the upper run to wash filter cake deposited thereon and, subsequent to each section, having compression means in the form of a respective device mounted above the upper run and operative to apply pressure to filter cake deposited thereon, each said device including a perforated pressure plate and means being provided to supply gas through said plates during compression of the respective sections of filter cake, and further having means for washing the belt in the lower run and for collecting wash liquor therefrom and recycling same to at least some of the aforesaid means for supplying wash liquor to the filter cake.

BRIEF DESCRIPTION OF THE DRAWINGS

The invention will be described further by reference to exemplary embodiments as illustrated in the accompanying drawings, in which.

DETAILED DESCRIPTION OF ILLUSTRATED AND PREFERRED EMBODIMENTS

Figure 1:
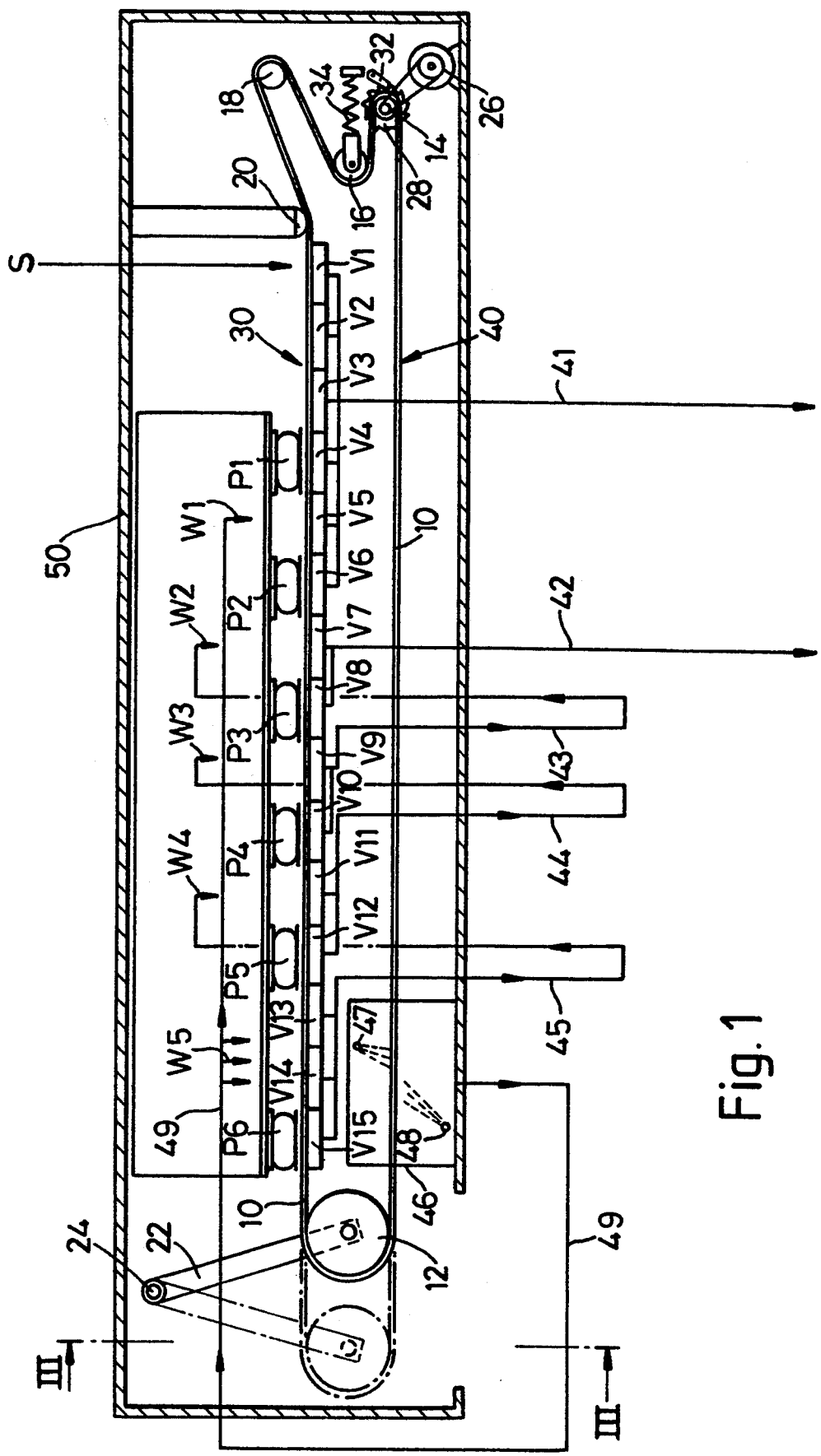
FIG. 1 is a diagrammatic side elevation of a preferred practical embodiment of apparatus in accordance with the present invention.

As shown in FIG. 1, a practical embodiment of filter apparatus in accordance with the present invention comprises an endless filter belt (10) mounted within a housing (50) which can be made gas tight during operation. The belt (10) is entrained around guide rollers (12, 14 16, 18) and below guide bar (20) to provide a substantially horizontal upper run (30), extending between the guide bar (20) and the guide roller (12), and a lower return run (40). In use, the upper run (30) moves from right to left as seen in FIG. 1, and the lower run (40) from left to right, so the guide bar (20) is at the upstream end of the upper run and the guide roller (12) at the downstream end thereof.

Figure 3:
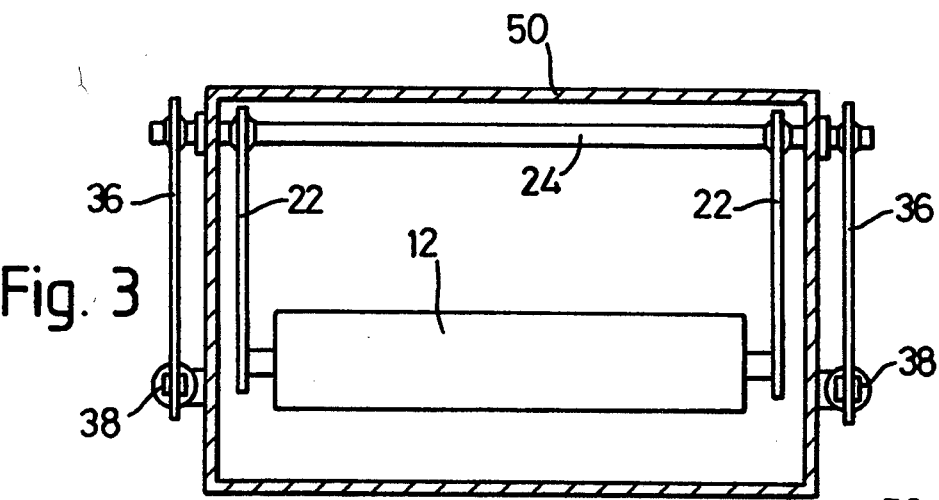
FIG. 3 is an enlarged transverse cross section of the apparatus of FIG. 1 or FIG. 2 along the line III—III therein.
Figure 4:
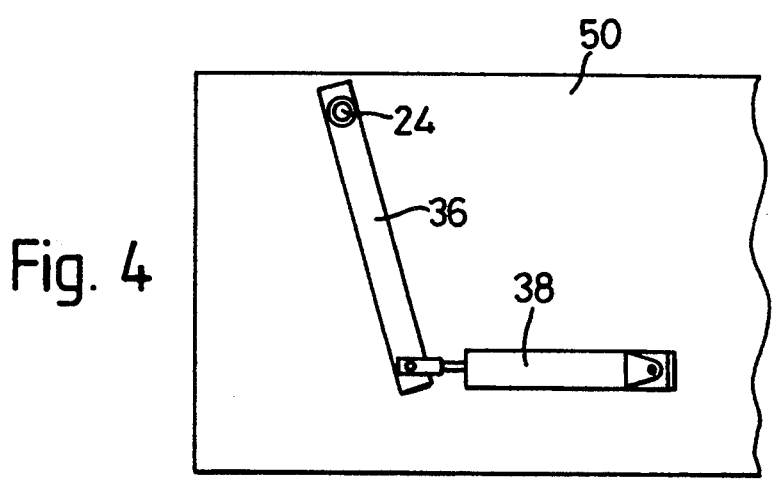
FIG. 4 is a fragmentary side view of the exterior of the apparatus illustrating the means of reciprocating the main drive roller for the belt.

The guide roller (12) at the downstream end of the upper run is a main drive roller which is mounted between swingable arms (22), as shown in FIGS. 3 and 4. The arms (22) are fixed to and depend from a rotatable shaft (24), which extends through side walls of the housing (50). Rotation of the shaft (24) swings the arms (22) together with the roller (12) from the full line to the broken line position shown in FIG. 1 so as to advance the upper run (30) of the belt in a direction from right to left in FIG. 1. In the lower run (40) the guide roller (14) constitutes a secondary drive roller in that it is intermittently driven by a belt drive from a motor (26). Furthermore, this roller (14) has a one way mechanism in the form of a rachet (28) mounted at one end thereof and an associated pawl (32). By cooperating with the rachet (28) the pawl (32) permits movement of the lower run (40) of the belt (10) only from left to right as shown in FIG. 1. Thus, swinging of the main drive roller (12) to the dotted line position advances the upper run (30) without any belt material moving backwards from The lower run. The roller (16) is a spring loaded tensioning roller which reciprocates to and fro in a bight of the belt between the rollers (14) and (18) so as to take up slack and maintain belt tension as the roller (12) reciprocates.

In operation, the upper run (30) of the belt (10) is intermittently advanced by swinging of the roller (12) to the dotted line position. During alternate stationary phases of the upper run, the lower run (40) is drawn from left to right by actuation of the secondary drive roller (14) and the roller (12) passively returns to its full line position. As the roller (12) advances to the dotted line position the roller (16) is urged contrary to the bias of spring element (34). During the alternate phase of the belt movement cycle when the secondary drive roller (14) pulls the belt through the lower run the roller (16) moves to increase the bight again under the action of the spring (34). The tensioning roller (16) may move substantially horizontally or obliquely by having its end located in a track (not shown). The spring element (34) may consist of a gas spring or an air cylinder. However, other suitable spring means may be employed.

A plurality of vacuum trays are arranged below the upper run (30) of the belt (10). In the illustrated embodiment there are fifteen vacuum trays (sometimes referred to as boxes) designated V1 to V15, but the number may vary. These are linked to one or more suction pumps (not shown) in a manner well known in the art.

At the upstream end of the upper run (30), adjacent the guide bar (20), there is a slurry feed station S where the slurry or suspension of the solid and liquid to be separated is supplied to the upper surface of the belt (10). This may be accomplished via a feed pipe, or an overflow weir, or any other suitable supply means so long as a layer of slurry is applied to an upstream section of the upper run (30).

In the art, the separation or filtration process is often referred to as "dewatering", although the mother liquor and/or wash liquor removed need not be water, and will rarely (if ever) be a pure liquid.

A plurality of feed means, conventionally in the form of nozzles, supply wash liquor to the upper run (30) of the belt downstream of the slurry supply station S. In the illustrated embodiment There are five such feed means designated W1 to W5 and the feed means W5 closest to the downstream end of the upper run may consist of several nozzles.

A plurality of compression devices are also arranged above the upper run (30). In the illustrated embodiment there are six such devices designated P1 to P6. P1 is arranged between the slurry feed station S and the upstream wash liquor nozzle W1. The remainder of the compression devices P2 to P5 are mounted spaced apart at locations downstream of each of the successive wash liquor feed means W1 to W5 so that as filter cake formed on the upper run (30) passes downstream as the upper run intermittently advances it is subjected, alternately, to supply of wash liquor and then compression.

Although each vacuum tray V1 to V15 has its own outlet, the outlets of groups of adjacent trays are connected to respective common outflow pipes (41) to (45). In each case, the vacuum tray or trays below a section of the belt supplied with wash liquor and the tray or trays below the succeeding compression device in the downstream direction of the upper run (30) are connected to a common outflow. Thus, in the illustrated example trays V1 to V6 below the slurry supply S, the first wash liquor feed W1 and the first two compression devices P1 and P2 are connected to common outflow pipe (41), trays V7 and V8 below the second wash liquor feed W2 and its following compression device P3 are connected to pipe (42), trays V9 and V10 below the wash liquor feed W3 and its following compression device P4 are connected to pipe (43), trays V11 and V12 below the fourth wash liquor feed W4 and its following compression device P5 are connected to pipe (44), and finally trays V13 to V15 below the fifth wash liquor feed W5 and the final compression device P6 are connected to pipe (45). In each case the compression device maximises removal of free moisture from the filter cake before the next application of wash liquor, and the foregoing arrangement of vacuum connections prevents mixing of successive volumes of extracted liquid. This is important for maximizing the overall extraction efficiency and minimising the overall volume of wash liquor in the proposed arrangement which involves recycling of certain portions of the extracted liquid (filtrate). In the illustrated arrangement, for example, pipe (45) recycles liquor extracted during the final washing and compression stage at the downstream end of the upper run to the next adjacent upstream wash liquor nozzle W4, while pipes (44) and (43) similarly recycle liquor to respective wash liquor nozzles W3 and W2 immediately upstream of the belt section from where the liquor has been extracted.

At the downstream end of the upper run (30), adjacent the drive roller (12), dewatered filter cake is discharged by simply falling from the belt, or with the assistance of a doctor blade (not shown).

In the lower run (40), the belt travels through a belt wash box (46) where high pressure spray nozzles (47, 48) positioned both above and below the belt direct wash liquor at both surfaces to clean the belt thoroughly by dislodging any adhered solid particles as well as any particulate matter embedded in the porous fabric of the belt (10). After leaving the wash box (46) the belt (10) may pass over suction nozzles (not shown), connected to a small exhauster, which suck the belt dry before it travels further.

As shown, belt wash liquor draining from the wash box (46) is recycled via pipeline (49) to the first and last washing zones of the upper run (30), i.e. to the nozzles at W1 and W5. Approximately 80% of the volume of recycled belt wash liquor passes through the nozzles at W5, the remaining approximately 20% passing to the nozzle at W1. This apportionment may be achieved simply by a needle valve positioned in the pipe (49), just beyond the nozzles at W5, or by a suitable narrowing of the pipe diameter beyond the nozzles at W5.

In the illustrated counter current recycling arrangement (where wash liquor is recycled in a direction counter to the direction of movement of the filter cake), fresh wash liquor is only supplied, via the nozzles (47, 48), to the belt wash box (46) and extracted liquor is only removed from the system via the pipelines (41, 42) leading from the first eight vacuum trays at the upstream end of the upper run. The amount of wash liquor supplied is carefully controlled and operation of the nozzles (47, 48) is synchronised with the motion of the belt, as will shortly be described, so that the efficiency of separation of insoluble and soluble solids (the latter in the wash liquor) is maximized while the volume of wash liquor used is minimized.

Figure 9:
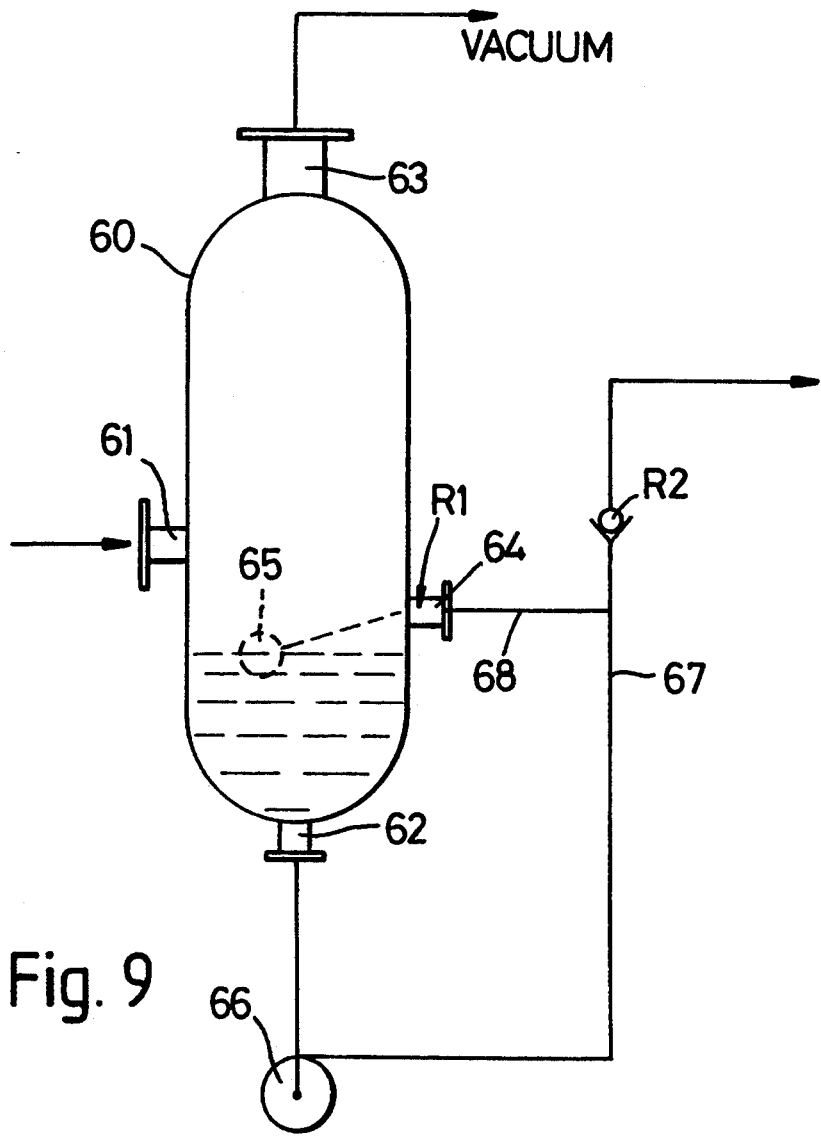
FIG. 9 is a schematic diagram of a receiver as connected to each pipeline leading from the vacuum trays in the apparatus of FIG. 1.

Although not apparent from the schematic diagram of FIG. 1, which has purposely been kept simple to show the overall arrangement of the components of the system, each pipeline (41) to (45) has a respective liquid receiver installed therein which is connected to a suction pump. Such a receiver (60) is illustrated schematically in FIG. 9.

As shown, the receiver (60) is a closed vessel having an inlet (61) receiving liquor from the vacuum trays, an outlet (62) at its lower end through which liquor is supplied for recycling to upstream wash liquor nozzles (or in the case of the pipelines (41, 42), for collection and, if appropriate, further treatment), a port (63) at its upper end which is permanently connected to vacuum (i.e. the aforesaid suction pump), and a further port (64) in which is mounted a valve R1 connected to a ball cock (65). The outlet (62) is connected to a pump (66), which is kept permanently running, and thence to an outflow pipe (67). A non-return valve R2 is fitted in the pipe (67) beyond a branch (68) to the valve R1. In operation, liquor (filtrate) enters the inlet (61) and provided there is an adequate volume this is delivered by the pump (66). However if the pumping rate overtakes the rate of inflow of liquor the ball cock (65) drops and opens the valve R1. This creates a vacuum at the discharge side of the pump (66) which closes the non-return valve R2 so liquor is returned via the branch (68) instead of being pumped away until the level of liquor in the receiver builds up again, and raises the ball cock (65) so as to close the valve R1. In practice, the valve R1 tends not to open and close but rather to be held partially open so as to allow sufficient liquor to re-enter from the branch (68) to maintain a constant level in the receiver vessel. In this way a constant stream of liquor can be delivered (to the upstream nozzles or the collection pipe) the volume of which per unit time only varies in accordance with the rate of inflow of liquor. In this way an automatic balance is achieved between incoming and outgoing liquid, which is essential in the case of liquor for recycling.

Also in each pipeline (41) to (45), upstream of the receiver in the direction of fluid flow, there is a respective valve arrangement (not shown) (for example as disclosed in prior GB specification No. 2203521 also of the same inventor) whereby the line, and the trays from which it leads, are connectable either to the receiver, and thence to vacuum, or to atmosphere. In this way, by switching of the valve arrangement the trays may be selectively connected to vacuum or not.

A pump (not shown) is also included in the pipeline (49) to transfer liquor from the wash box (46) to the feed means W1 and W5. A diaphragm pump which can run dry is preferable in case its rate of pumping should exceed the rate of incoming liquor from the wash box (46) at some stages. Wash liquor may leave the wash box (46) via an adjustable valve arrangement or simply a restricted aperture. Advantageously, a receiver, similar to that shown in FIG. 9, but not connected to vacuum, may be included in the pipeline (49) along with the aforesaid pump (which will constitute pump (66) in FIG. 9) so that an even flow of liquor is maintained to the nozzles at W1 and W5.

Figure 8:
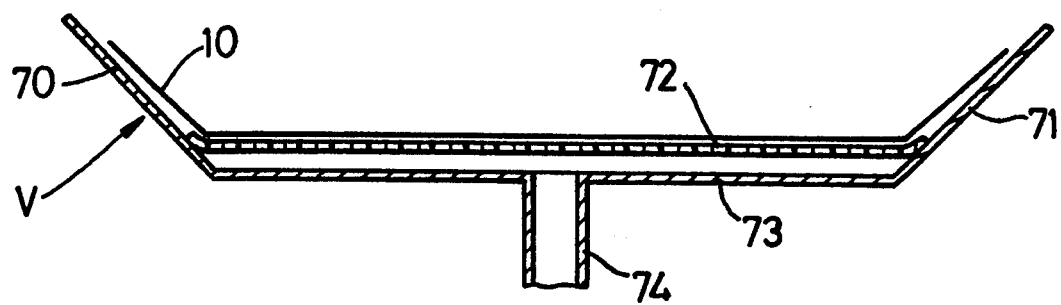
FIG. 8 is an enlarged transverse cross section of an individual vacuum tray of the apparatus of FIG. 1.

A preferred form of each vacuum tray V1 to V15 is shown in FIG. 8. In this respect the tray, designated simply V in FIG. 8, has a constant cross-section with sloping side walls (70, 71) and a grid (72) fits into the base of the tray at a spacing from the bottom wall (73) thereof, from which outlet (74) leads. The belt (10), or rather a short section of the belt (10), overlies the tray as shown, extending up the side walls (70, 71). The inclination of the side walls (70, 71) assists tracking of the belt, i.e. maintenance of its alignment, as it moves, and also prevent spillage of liquid or solids from the upper surface of the belt.

Figure 5:
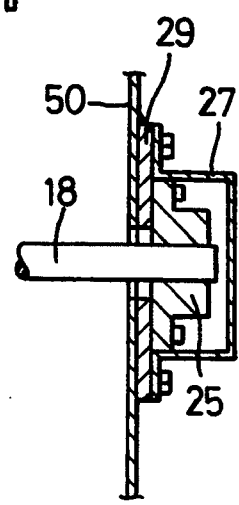
FIG. 5 is a fragmentary section illustrating the mounting at each end of each guide roller for the belt.

FIGS. 3 to 5 illustrate how the main drive roller (12) may be reciprocated and how the remaining guide rollers (14) and (18) may be mounted onto the gas tight housing (50). Reciprocation of the roller (12) may be readily achieved by auxiliary rocker arms (36) which are fixed to the shaft (24) outside the housing (50) and swung by respective pneumatic rams (38) secured to the outside of the housing (50). The guide rollers (14) and (18) may have their ends jounalled in bearings (25) which are mounted externally of the housing (50) and are sealed off, in each case, by a flanged cover (27) mounted by way of a gasket (29).

Figure 6:
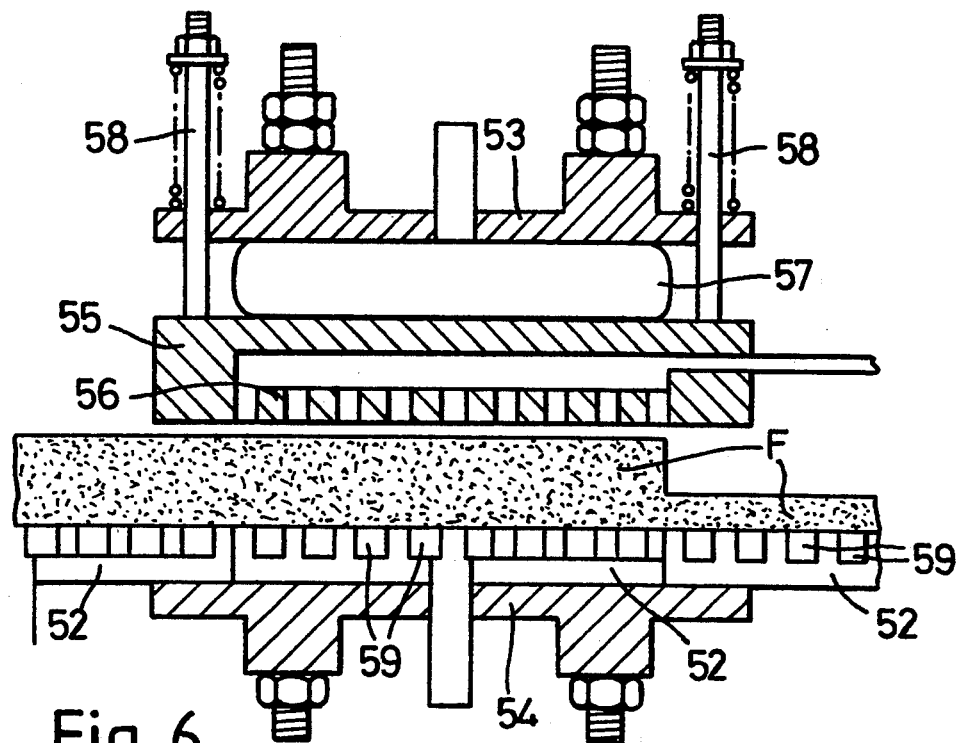
FIG. 6 is an enlarged fragmentary cross section through a single compression device with the pressure plate in the raised, inoperative position.
Figure 7:
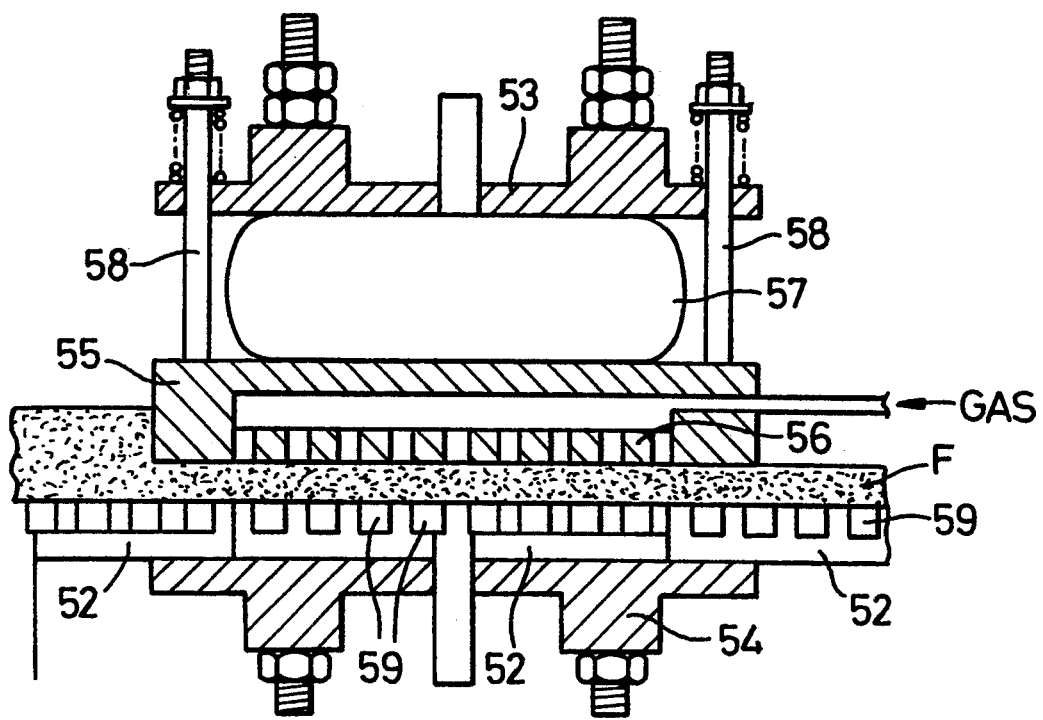
FIG. 7 is a corresponding view of the compression device of FIG. 6 with the pressure plate in the lowered, operative position.

FIGS. 6 and 7 illustrate a compression device of the type which may be employed for each of the devices P1 to P6 in FIG. 1. The vacuum trays (52) shown below the belt in FIGS. 6 and 7 are, however, of different form to those indicated in FIG. 8. This exemplary device consists of a fixed mounting plate (53) arranged above the belt (10) and an aligned support plate (54) fixed below the belt (10), immediately below the vacuum trays (52) which have channels (59) formed in their upper surface. A movable pressure plate (55), having a perforated front wall (56) facing the belt (10) is mounted below the plate (53) by way of spring-loaded pillars (58), with an inflatable element (57) therebetween. In use, as is evident from FIG. 7, inflation of the element (57), urges the pressure plate (55) downwards to compress filter cake F formed on the belt (10). At the same time, gas, such as compressed air is supplied to a chamber within the pressure plate (55) and issues through the perforations in the front face (56). Supply of gas in this way is found to assist dewatering of the cake F, possibly by atomizing liquid trapped between the solid particles of which the cake is formed. Whilst compression alone does not necessarily enhance the degree of dewatering as it closes off passages in the cake through which liquid may otherwise escape, blowing of gas through the cake at the same time as compression has been found to improve dewatering by up to 25%.

If the enclosure 50 is to be made gastight during operation of the apparatus, a rotary valve or rotary seal may be used to releasably close off the opening dipicted at the lower left hand end of the enclosure in FIG. 1 while allowing the filter cake dropping from the downstream end of the upper run (30) to pass through at intervals. As an alternative to a rotary valve or seal, a series of three valves may be used which operate in sequence so that filter cake passes through each in turn while the other two are closed. In this way it is possible to maintain pressure within the vessel 50. The overall sequence of operation of the apparatus is generally as follows:

The rams (38) are actuated to swing the main drive roller (12) forward to the dotted line position, so as to advance the upper run (30), as has already been explained, several times per minute. For example, the upper run may be advanced anything from 5 to 15 times per minute. Each period of forward motion lasts a few seconds, following which there is a period of a few seconds during which the upper run is stationary, while the lower run (40) is drawn through by the motor (26), before the upper run is again advanced. The upper run may, for example, be anything from 5 to 15 meters long and it may take from 2 to 10 minutes for any particular section of belt to travel from the upstream to the downstream end in the aforesaid intermittent fashion.

However, the belt may be moved more slowly than just mentioned, e.g. once every three minutes or even less frequently (instead of several times per minute) in which case it will take considerably longer for each section of the belt to pass down The upper run and complete a full cycle.

During each stationary phase of the upper run, slurry is fed in at S, the vacuum trays V1 to V15 are connected to vacuum, and the compression devices P1 to P6 are actuated to the condition shown in FIG. 7 so that successive sections of filter cake further downstream are actively dewatered. Additionally, with the housing (50) closed, gas pressure may be exerted by pressurization of same.

Prior to each movement of the upper run feeding of slurry is stopped, suction pressure via the vacuum trays V1 to V15 is released (by connection of lines (41) to (45) to atmosphere by the respective valve arrangements previously mentioned) and the pressure plates (55) of the compression devices P1 to P6 are raised to the position shown in FIG. 6. Also, if the housing is pressurised, pressure may be relieved by venting. These operations may be controlled by one or more timers which automatically reset, or reset upon actuation of the rams (38). Ideally, at each advance the belt will be pulled through the upper run for a distance corresponding to the length of one of the vacuum trays V1 to V15. Each time the upper run stops moving feed of slurry and application of vacuum and compression are initiated again, under control of the timer(s).

During each stationary phase of the upper run, once slurry feed has recommenced, the secondary drive roller (14) pulls the roller (12) back to the full line position and at the same time pulls the lower run (40) through the belt wash box (46). The nozzles (47, 48) are switched on in synchrony with the drive for the roller (14) and the speed at which the belt (10) is drawn through the box (46) is controlled to optimize washing thereof. The nozzles (47, 48) are switched off again as soon as the relevant section of belt has traversed the box (46).

As previously described, the wash liquor sprayed from the nozzles (47, 48) is collected and recycled via line (49) to the first and last wash liquor feeds W1, W5 for the upper run.

The invention is not limited to details of the exemplary embodiment, which are given only by way of illustration.

Figure 2:
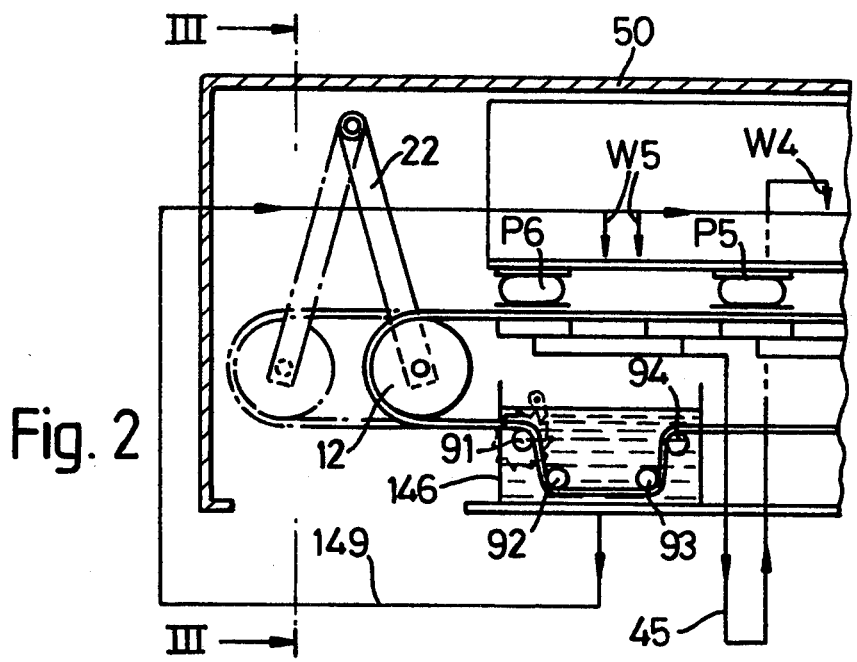
FIG. 2 is an enlarged fragmentary view corresponding to the left hand end of FIG. 1 of a second embodiment having an alternative form of wash means for the filter belt.

FIG. 2 shows an alternative manner of belt washing which may be employed instead of or in addition to the wash box (46) with spray nozzles (47, 48) in FIG. 1, depending on the type of materials being treated. As indicated, the belt in its lower run is passed through a soaking vessel (146), being guided therethrough by respective rollers (91) to (94), with a one-way device, represented by ratchet and pawl (95, 96) applied to the first of those so as to prevent the lower run being pulled back (from right to left) as the main drive roller (12) swings forwards to the dotted line position. When used alone, wash liquor (solvent) may be supplied only to this vessel (146), and may be gradually drained off and recycled via line (149) in the same way as illustrated in FIG. 1 and described in relation thereto. When used in addition to a wash box (46), wash liquor may be supplied separately to both the box (46) and the vessel (146, and may be recycled from one or both of those. In this respect, the solvent used in vessel (146) may not be the same as the wash liquor used in the box (46) or for cake washing in the upper run.

Other components of the apparatus shown in FIG. 2 are directly comparable to those in FIG. 1 and have been designated by the same reference numerals.

In any event, supply of some fresh wash liquor for washing of the filter cake in the upper run at at least one of the wash stations thereof is not precluded in accordance with the invention, so long as recycling of belt wash liquor takes place.

Many other variations in detailed construction of the apparatus are possible and only a few will be mentioned here. The drive roller (12) may be reciprocated by swingable arms pivoted below the belt, or may be reciprocated by direct connection to the ram of a pneumatic or hydraulic cylinder. Enclosure of the apparatus in a gas tight housing is not essential. The compression devices may have the pressure plate movable by means other than the inflatable element shown in the drawings, for example by hydraulic or pneumatic rams, or other bellows like or diaphragm means. The tensioning means for the lower run may also vary, and in particular may comprise a roller which is vertically reciprocable in a bight of the belt and the weight of which is adequate to draw the lower run through, when the main drive roller is no longer actively pushed forward, without need for secondary drive means in the lower run.

I claim:

1. Filter apparatus comprising:

an endless filter belt;

guide means guiding said belt to provide a substantially horizontal upper run and a lower return run;

first feed means for feeding slurry to be filtered onto said upper run;

vacuum means arranged below the upper run of the belt and operative through the belt to suck liquid from slurry on the upper run and leave a filter cake deposited thereon;

a plurality of second feed means for supplying wash liquor to successive sections of the upper run to wash filter cake deposited thereon;

progressing means operative to progress the belt by alternate incremental motion of the upper run and the lower run, the upper run moving from an upstream end to a downstream end thereof, said progressing means comprising a reciprocal guide element at the downstream end of the upper run and a one way device and tensioning means, both operative on the lower run of the belt;

means for washing the belt in its lower run and for collecting wash liquor therefrom and recycling same to at least some of said plurality of second feed means; and compression means in the form of a plurality of devices mounted at spaced locations above the upper run and operative to apply pressure to filter cake deposited thereon at locations subsequent to each section supplied with wash liquor from said plurality of second feed means, each device including a perforated pressure plate and means being provided to supply gas through said plates during compression of the respective sections of filter cake.

2. Apparatus as set forth in claim 1 wherein wash liquor is recycled from belt washing in the lower run to at least two sections of the upper run, one section towards the upstream end of the upper run and one section towards the downstream end of the upper run.

3. Apparatus as set forth in claim 2 wherein the volume of wash liquor recycled from belt washing in the lower run to the downstream end of the upper run is greater than the volume recycled to the upstream end of the upper run.

4. Apparatus as set forth in claim 3 wherein of the total volume of wash liquor recycled from belt washing in the lower run, approximately 80% is recycled to the downstream end of the upper run and approximately 20% is recycled to the upstream end of the upper run.

5. Apparatus as set forth in claim 3 wherein the volume of recycled of wash liquor is apportioned between upstream and downstream sections of the upper run by means of a needle valve in a pipe in which the recycled wash liquor flows to the second feed means.

6. Apparatus as set forth in claim 3 wherein the volume of wash liquor recycled from belt washing in the lower run is apportioned between upstream and downstream sections of the upper run by virtue of different diameters of pipe section supplying recycled wash liquor to the second feed means for the respective sections of the upper run.

7. Apparatus as set forth in claim 1 wherein wash liquor drawn into at least some of said vacuum means arranged below the upper run towards the downstream end thereof is recycled to at least some of said second feed means for supply to the belt further upstream of those vacuum means.

8. Apparatus as set forth in claim 7 wherein said vacuum means consists of a plurality of vacuum trays, each having a separate outlet, and the tray or trays below each section of the upper run supplied with wash liquor by respective second feed means and the tray or trays below the respective succeeding compression device in the downstream direction of the upper run are connected to a common outflow, so that successive portions of extracted liquor are collected separately for recycling.

9. Apparatus as set forth in claim 1 wherein the reciprocal guide element at the downstream end of the upper run is mounted on swingable arms.

10. Apparatus as set forth in claim 1 including a gas tight vessel in which said filter belt, said guide means, said first and second feed means, said vacuum means, said progressing means, said washing means and said compression means are housed.

* * * * *